(12) United States Patent
Park

(10) Patent No.: US 6,233,058 B1
(45) Date of Patent: May 15, 2001

(54) METHOD AND APPARATUS FOR PRINTING SET CONTENTS OF A MOBILE UNIT IN A FACSIMILE APPARATUS HAVING A MOBILE UNIT

(75) Inventor: Joo-Seung Park, Kumi (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/099,389

(22) Filed: Jun. 18, 1998

(30) Foreign Application Priority Data

Aug. 6, 1997 (KR) ................................ 97-37550

(51) Int. Cl.[7] .................................................. B41B 1/419
(52) U.S. Cl. ........................................... 358/1.15; 358/442
(58) Field of Search ................................. 382/313, 314, 382/317; 358/442, 448, 468, 400, 479, 478, 494, 497, 1.15

(56) References Cited

U.S. PATENT DOCUMENTS

| | | | |
|---|---|---|---|
| 4,788,714 | 11/1988 | Hashimoto | 379/74 |
| 4,922,524 | 5/1990 | Baba et al. | 379/100 |
| 4,962,526 | * 10/1990 | Kotani et al. | 379/100 |
| 5,172,243 | * 12/1992 | Hayashi et al. | 358/476 |
| 5,200,830 | 4/1993 | Imaizumi et al. | 358/296 |
| 5,200,991 | 4/1993 | Motoyanagi | 379/61 |
| 5,255,312 | 10/1993 | Koshiishi | 379/100 |
| 5,282,238 | 1/1994 | Berland | 379/58 |
| 5,299,024 | 3/1994 | Kafri | 358/400 |
| 5,402,251 | * 3/1995 | Ogasawara et al. | 358/473 |
| 5,426,511 | 6/1995 | Nagatomo | 358/402 |
| 5,479,485 | 12/1995 | Hayashi | 379/61 |
| 5,519,763 | 5/1996 | Namekawa et al. | 379/61 |
| 5,555,100 | * 9/1996 | Bloomfield et al. | 358/407 |
| 5,608,545 | 3/1997 | Kagawa | 358/468 |
| 5,699,171 | 12/1997 | Minamizawa et al. | 358/440 |
| 5,748,337 | 5/1998 | Minamizawa | 358/468 |
| 5,854,694 | * 12/1998 | Payne et al. | 358/473 |

* cited by examiner

Primary Examiner—Jerome Grant, II
Assistant Examiner—Kevin C Kianni
(74) Attorney, Agent, or Firm—Robert E. Bushnell, Esq.

(57) ABSTRACT

A facsimile apparatus having a mobile unit prints set contents of the mobile unit on the recording paper, so as to allow the user to confirm the set contents accurately. The mobile unit reads set contents data stored in a memory of the mobile unit in response to a print request for the set contents and transmits the read set contents data to the facsimile apparatus. Then, the facsimile apparatus receives the set contents data and prints the set contents on the recording paper. The print request is made by depressing a print request key of the facsimile apparatus or of the mobile unit.

11 Claims, 4 Drawing Sheets

METHOD AND APPARATUS FOR PRINTING SET CONTENTS OF A MOBILE UNIT IN A FACSIMILE APPARATUS HAVING A MOBILE UNIT

CLAIM OF PRIORITY

This application makes reference to, incorporates the same herein, and claims all benefits accruing under 35 U.S.C. §119 from an application entitled Method For Printing Set Contents of Mobile Unit in Facsimile Apparatus Having Mobile Unit earlier filed in the Korean Industrial Property Office on Aug. 6, 1997, and there duly assigned Serial No. 97-37550 by that Office.

BACKGROUND OF THE INVENTION

1. Field of the Invention

The present invention relates to a facsimile apparatus having mobile units, and in particular, to a method for printing set contents of the mobile units.

2. Description of the Related Art

In a facsimile apparatus having one or more mobile units, a user of the mobile unit can freely change the contents set in the mobile unit by way of key operation. In case the mobile unit has a display unit such as a liquid crystal display (LCD), the mobile unit can display the set contents thereof on the LCD, enabling the user to ascertain the set contents. However, in case the mobile unit does not have the display unit, the user cannot confirm the set contents of the mobile unit unless he or she separately records or manages the set contents whenever the set contents are changed. Furthermore, although the mobile unit has the display unit, the mobile unit can be restricted in fully displaying the set contents due to a size limitation. Further, where the facsimile apparatus has a plurality of mobile units, it is difficult for the user to ascertain the set contents of the respective mobile units.

U.S. Pat. No. 4,788,714 to Hashimoto entitled Remote Controlling Telephone Unit for Selectively Activating One of a Plurality Devices discloses a remote control unit that controls at least one additional device such as a facsimile system through a telephone answering device. It is disclosed that the telephone answering device is engaged with telephone lines upon reception of a ringing signal, and an outgoing message and an instruction message are sent out. It is disclosed that a calling party can record an incoming message in a recorder in a telephone answering device if desired. It is further disclosed when calling party wishes to drive an additional device, a remote control signal corresponding to the desired additional device is sent in accordance with the instruction message.

U.S. Pat. No. 4,922,524 to Baba et al. entitled Facsimile System with a Voice Transmission Function disclose a facsimile communication method including a voice relay mode. It is disclosed that when the voice relay mode have been established, image information is first transmitted from a transmitter to a receiver and then a voice message arbitrarily created by an operator of the transmitter is also transmitted from the transmitter to the receiver, together with a telephone number of an addressee of the image information.

U.S. Pat. No. 5,200,830 to Imaizumi et al. entitled Facsimile Apparatus Capable of Receiving and Printing Multiple Kinds of Data in Accordance with a Predetermined Priority Order disclose a facsimile apparatus that has a first operating mode in which first data entered through an interface from an external unit is received in precedence over second data entered through a modem from other facsimile apparatus over a communication line, and a second operating mode in which the second data is received in precedence over the first data, and is operative to receive and print data in accordance with the mode of priority order set on a switch. It is disclosed that the apparatus is provided with the two sheet delivery ports so that print paper on which the first data is printed and print paper on which the second data is printed are delivered separately to the respective delivery ports. A printing means is disclosed which incorporates a sheet feed means, with print data being disclosed as being supplied by a controller.

U.S. Pat. No. 5,200,991 to Motoyanagi entitled Image Communication System Including A Mobile Telephone Set and a Facsimile Device disclose an image communication apparatus in which a mobile telephone set of a cordless telephone device is connected with a facsimile device through a connector and in which the connection of a telephone line of the mobile telephone set with a communication unit of the facsimile device is controlled on the basis of the state of the connection and the state of a telephone line for facsimile communication. A connection cord for the facsimile device is disclosed as not being required to enable free movements of an operator and the devices.

U.S. Pat. No. 5,255,312 to Koshiishi entitled Facsimile Machine Connectable to Various Communication Equipments discloses a facsimile machine which is coupled to a telephone line and a telephone set, where the facsimile machine connects the telephone set to the telephone line in a telephone mode and disconnects the telephone set from the telephone line in a facsimile mode so as to use the telephone line as a communication line for a facsimile communication, and the facsimile machine is connectable to a communication equipment via an interface unit which is designed exclusively for the communication equipment.

U.S. Pat. No. 5,282,238 to Berland entitled Facsimile Radio Communication System discloses a communication system which enables conventional telephone-type facsimile apparatus to communicate over a conventional two-way voice radio communication system. The system is disclosed as including an interface unit which is connected to the facsimile apparatus and to the transceiver apparatus of the radio communication system. It is disclosed that the interface unit transmits and receives information over the radio system in the form of a series of data packets, each containing origin address, destination address, send sequence and check digit information. A telephone line interface is disclosed that connects to a demodulator, converting received audible tones into digital data, with the information being sent to a thermal printer which reproduces the image of the original document transmitted from a compatible facsimile transceiver.

U.S. Pat. No. 5,299,024 to Kafri entitled Method and Apparatus for Broadcasting and Receiving Broadcasted Information discloses a system for broadcasting and receiving broadcasted information, wherein a first fax or modem is connected through a transmitter interface to a radio transmitter and a second fax or modem is connected through a receiver interface to a radio receiver. It is disclosed that information to be broadcast is encoded by the first fax or modem, transmitted through the transmitter interface and broadcasted. One or more receivers it is disclosed capture the broadcasted information and transmit the captured information through their respective receiver interfaces to their respective second fax machines where the information is decoded and recorded.

U.S. Pat. No. 5,426,511 to Nagamoto entitled Facsimile System with Base Unit Connected to Wire Network and in Communication with Multiple Extensions Sets by Wire or Radio Transmission discloses a facsimile system which includes a base station connected to a wire network, and a plurality of extension sets connected to the base station through radio networks. The base station includes a network control unit for receiving an image signal received through the wire network, a printer for outputting an image corn responding to the image signal received by the network control unit, a control circuit for calling an extension set in response to a call signal received through the wire network, a switching circuit for connecting the wire network to the network control unit in response to a response signal transmitted from the called extension set, and a transceiver for receiving the image signal transmitted from the extension set and sending the image signal to the wire network. It is disclosed the extension set included an image sensor for scanning a document, a transceiver for transmitting the image signal output from the image sensor to the base station, an operation section for manually designating the start of facsimile reception, and an extension set control circuit for sending out the response signal to the base station when the start of facsimile reception is instructed.

U.S. Pat. No. 5,479,485 to Hayashi entitled Facsimile Apparatus Comprising Cordless Telephone Set discloses a facsimile apparatus incorporating a cordless telephone function including a base unit for receiving and transmitting, a signal to and from a remote unit via a radio signal, and a facsimile communication device.

U.S. Pat. No. 5,519,763 to Namekawa et al. entitled Communication Apparatus with Wireless Intercommunication disclose a communication apparatus coupled to a telephone line including a base having a telephone portion, a fax portion including a fax modem, a first switch for switching the mode between fax and telephone, and a first wireless communication portion, and at least a cordless unit having a second wireless communication portion for communicating with the base, and a second fax portion including a recording/reading portion. A cordless phone it is disclosed can be further provided. It is disclosed that a cordless unit has a guidance portion for outputting a given message and if there is an extension call to another cordless unit in a fax mode, the other cordless unit transmits a control signal and the cordless unit outputs the message. It is disclosed that the wireless communication portion has multi-channels to provide a communication between cordless units even when a cordless unit receives a fax signal.

U.S. Pat. No. 5,608,545 to Kagawa entitled Facsimile Device and Communication Control Method Thereof discloses a facsimile device, which can be used with a portable telephone working on a built-in battery, having a voltage detecting section for detecting voltage of a battery of the portable telephone and a control section providing controls to inhibit facsimile communication depending on the voltage detected by the voltage detecting section when facsimile communication is executed with the portable telephone.

U.S. Pat. No. 5,699,171 to Minamizawa et al. entitled Facsimile Machine Having a Plurality of Own-Call-Numbers disclose a facsimile machine including a data obtaining device which obtains a plurality of sets of own-call-number data each set of which identifies a corresponding one of a plurality of different own call numbers allotted to the facsimile machine according to a common numbering rule, each of the different own call numbers identifying the facsimile machine from other facsimile machines to which other call numbers different from the own call numbers are allotted according to the common numbering rule, a plurality of memories which are related with the different own call numbers, respectively, and in which a plurality of batches of information are stored, respectively, and a transmitter which transmits, to one of the other facsimile machines, the batch of information stored in one of the memories which corresponds to one of the different own call numbers identified by one of the sets of own-call-number data obtained by the data obtaining device. Another facsimile machine is disclosed including, in addition to the data obtaining device, a plurality of memories related with the different own call numbers, respectively, and a receiver which receives a batch of image information from one of the other facsimile machines and stores a received batch of image information in one of the memories which corresponds to one own call number identified by one set of own-call-number data obtained by the data obtaining device.

U.S. Pat. No. 5,748,337 to Minamizawa entitled Facsimile Device Having a Printing Function discloses a facsimile device having a printer function, the facsimile device capable of a receiving data from another facsimile device and from a data processing device. The facsimile device is disclosed as including a device for setting a priority operating mode, the priority operating mode setting one of a print priority mode and a facsimile priority mode, and a device for setting at least one time out period.

SUMMARY OF THE INVENTION

It is therefore an object of the present invention to provide a method for printing set contents of a mobile unit on recording paper of a facsimile apparatus, thereby allowing the user to confirm the set contents accurately and simply.

To achieve the above object and other objects of the present invention, there is provided a method for printing set contents of a mobile unit in a facsimile apparatus having the mobile unit. In the method, the mobile unit reads set contents data stored in a memory of the mobile unit in response to a print request for the set contents and transmits the read set contents data to the facsimile apparatus. The facsimile apparatus receives the set contents data and prints the set contents on a recording paper. The print request can be made by depressing a print request key of the facsimile apparatus or the mobile unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will be described in detail hereinbelow with reference to the accompanying drawings. In the following description, numerous specific details are set forth to provide a more thorough understanding of the present invention.

Figure 1:
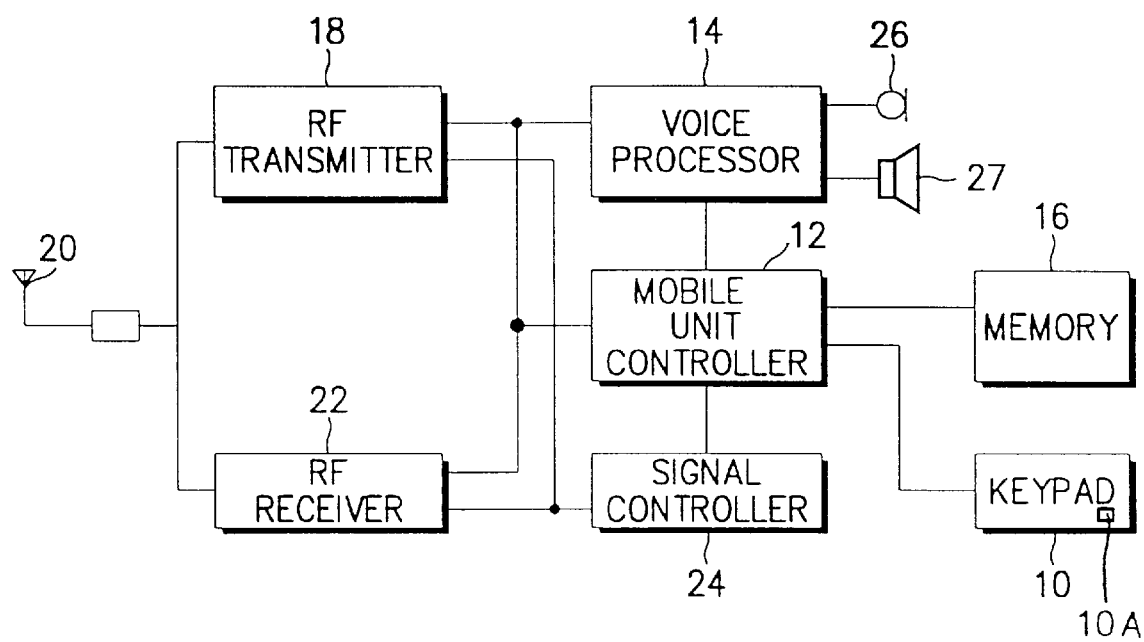
FIG. 1 is a block diagram of a mobile unit belonging to a facsimile apparatus applied to the present invention.

Referring to FIG. 1, a mobile unit 1 applied to the present invention includes a mobile unit controller or portable unit controller 12 for controlling an overall operation of the mobile unit 1. A keypad 10 includes a number of function keys and numeric keys, with which the user can set various functions and modes and dial telephone numbers. In particular, the keypad 10 according to the present invention includes a print request key 10A for the set contents of the mobile unit 1. Key data from the keypad 10 is provided to the mobile unit controller 12. A memory 16 stores a control program of the mobile unit 1, a password, and the set contents of the mobile unit 1. An RF (Radio Frequency) transmitter 18 wirelessly transmits a transmission voice signal output from a voice processor 14 and data output from the mobile unit controller 12 via an antenna 20, under the control of the mobile unit controller 12. An RF receiver 22 demodulates an RF signal wirelessly received through the antenna 20, to output the demodulated signal to the voice processor 14 and provide control data to the mobile unit controller 12. A signal controller 24 controls the RF transmitter 18 and the RF receiver 22 according to the control data output from the mobile unit controller 12. The voice processor 14 processes a voice signal input from a mouthpiece 26 of the mobile unit 1 and a voice signal output from the RF receiver 22. A speaker 27 is connected to voice processor 14.

Figure 2:
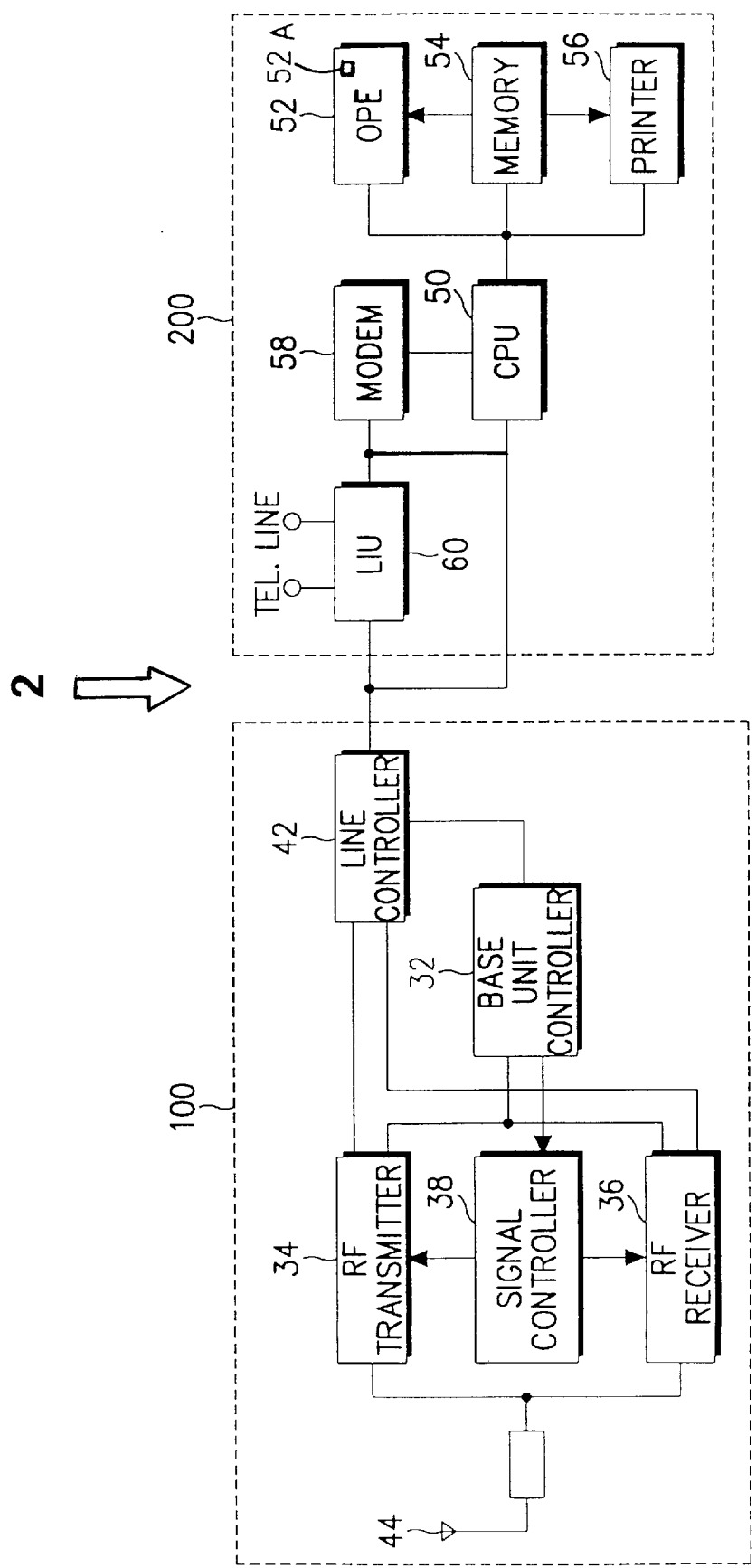
FIG. 2 is a block diagram of a facsimile apparatus applied to the present invention.

Referring, to FIG. 2, a facsimile apparatus 2 having the mobile unit 1 of FIG. 1, includes an RF section 100 and a facsimile section 200. As to the construction of the RF section 100, a base unit controller 32 controls an overall operation of the base unit (i.e., the RF section 100). The base unit controller 32 has an internal memory including a ROM (Read Only Memory) for storing a program and a RAM (Random Access Memory) for temporarily storing data generated in the process of executing the program. In particular, the internal memory can store a password of the mobile unit 1. An RF transmitter 34 modulates an input signal and wirelessly outputs the modulated signal through an antenna 44, under the control of the base unit controller 32. An RF receiver 36 demodulates a signal received wirelessly through the antenna 44 and outputs the demodulated signal to base unit controller 32. A signal controller 38 controls the RF transmitter 34 and the RF receiver 36 according to channel data output from the base unit controller 32. A line controller 42 selects a voice communication line and a data communication line to transmit/receive voice signals and data therethrough, under the control of the base unit controller 32.

As to the construction of the facsimile section 200, a central processing unit (CPU) 50 controls an overall operation of the facsimile section 200 according to a control program stored in a memory 54. In particular, the CPU 50 enables a printer 56 to print the set contents of the mobile unit 1 being received through the RF section 100 or the base unit of facsimile apparatus 2. A line interface unit (LIU) 60 connects a telephone line to a modem 58 under the control of the CPU 50, detects an incoming ring signal, and provides the detected ring signal to the CPU 50. The modem 58 demodulates a modulation signal input from the LIU 60, and modulates a transmission signal to be transmitted to the telephone line via the LIU 60. An operating panel equipment (OPE) 52 includes a plurality of keys for setting various functions supported by the facsimile and inputting commands, and in particular, a print request key 52A for the set contents of the mobile unit 1. The OPE 52 provides the CPU 50 with key data input by the user. Furthermore, the OPE 52 includes an LCD (Liquid Crystal Display) for displaying thereon an operating status of the facsimile section 200 under the control of the CPU 50. The printer 56 prints image data received from a party or read from a document on the recording paper, under the control of the CPU 50. The memory 54 includes a ROM and RAM, in which the ROM stores the control program of the CPU 50, and the RAM stores the image data received from a party or read from the document and temporarily stores data generated in the process of executing a specific function of the facsimile apparatus 2.

Figures 3A, 3B:
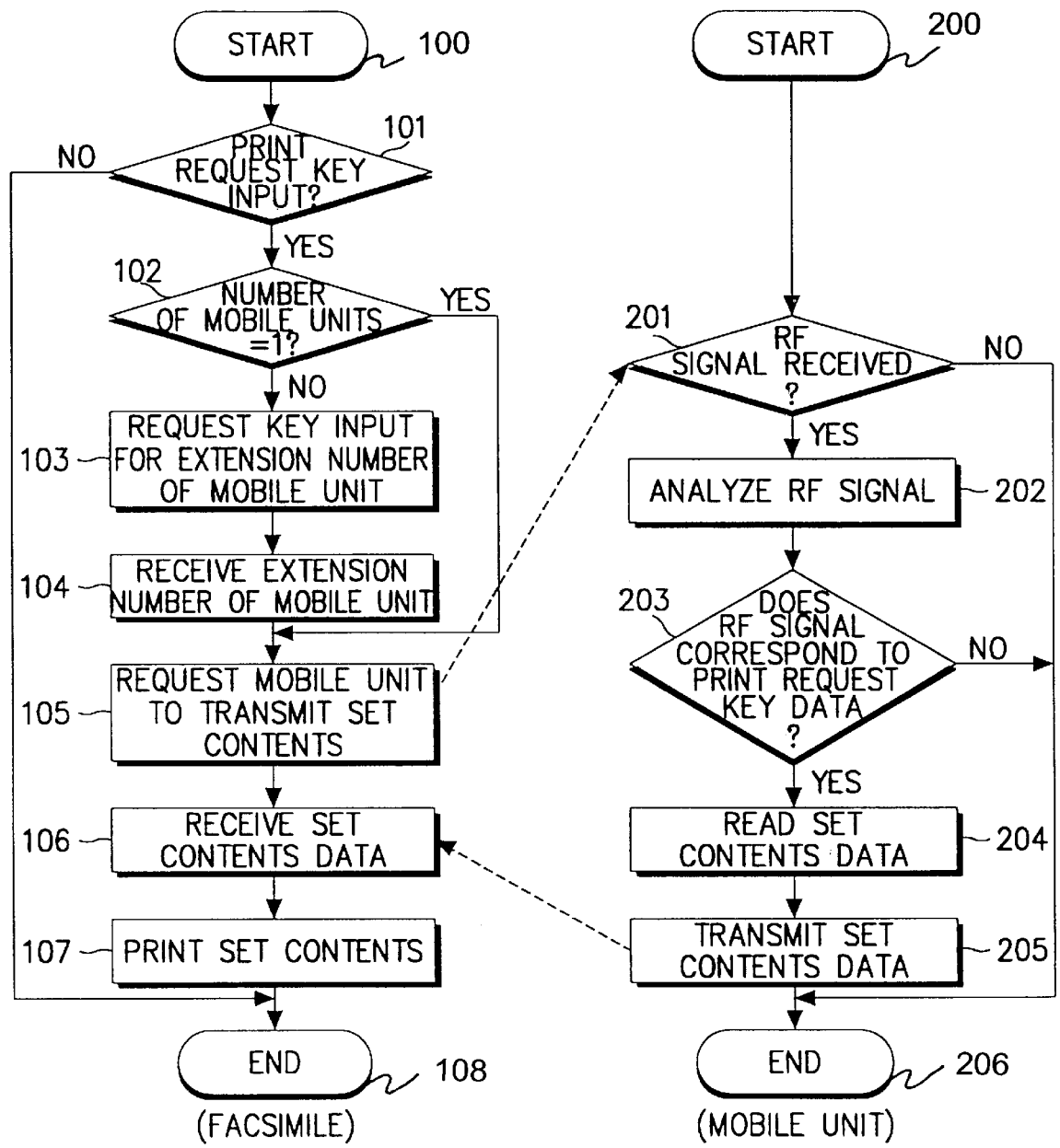
FIGS. 3A and 3B are flow charts for printing set contents of the mobile unit in response to a print request from the facsimile apparatus according to an embodiment of the present invention.

FIGS. 3A and 3B illustrate flow charts for printing the set contents of the mobile unit 1 in response to a print request from the facsimile apparatus 2 according to an embodiment of the method of present invention. The facsimile apparatus 2 communicates with the mobile unit 1 through a radio channel therebetween. Referring to the drawings, FIGS. 1 and 2, by depressing the print request key 52A, the user of the facsimile apparatus 2 generates print request key data and makes a request for printing the set contents of the mobile unit 1. In case the facsimile apparatus 2 has a plurality of the mobile units 1, the facsimile apparatus 2 selects (i.e., dials) an extension number for the mobile unit 1 for which the set contents are to be printed, and requests the selected mobile unit 1 to transmit the set contents data (i.e., the data corresponding to the set contents). Upon receiving the data for the set contents, the facsimile apparatus 2 prints using printer 56 the set contents on the recording paper.

Referring to FIGS. 3A and 3B, steps 101–107 of FIG. 3A show a control flow of the facsimile apparatus 2 and steps 201–205 of FIG. 3B show a control flow of the mobile unit 1. The method starts at step 100. The method then proceeds to step 101 where the CPU 50 of the facsimile apparatus 2 checks whether print request key data for the set contents of the mobile unit 1 is input from the OPE 52. If the print request key data is input, the CPU 50 proceeds the method to step 102 and, if not, the CPU 50 proceeds the method to step 108 and ends the procedure and remains in a stand-by state. At step 102, the CPU 50 checks the number of mobile units 1 for the facsimile apparatus 2. If the facsimile apparatus 2 has a single mobile unit 1 registered therein, the CPU 50 jumps the method to step 105. However, if the facsimile apparatus 2 has a plurality of the mobile units 1, the CPU 50 proceeds the method to step 103. At step 103, the CPU 50 displays a message requesting a key input for the extension number for the mobile unit 1 of which the set contents are to be printed, the message being displayed on the LCD of the OPE 52. The method proceeds to step 104 where the CPU 50 receives the extension number for the mobile unit 1 that the user has input using the OPE 52. Thereafter, the method proceeds to step 105 where the CPU 50 transmits an RF signal requesting transmission of the set contents to the selected mobile unit 1 via the RF transmitter 34.

Then, at the mobile unit 1, the method starts at step 200 and proceeds to step 201 where the mobile unit controller 12 checks whether the RF receiver 22 has received the RF signal transmitted from the facsimile apparatus 2. If the RF signal is received, the mobile unit controller 12 proceeds the method to step 202 and, if not, the mobile unit controller 12 proceeds the method to step 206 and ends the program and remains in the stand-by state. At step 202, the mobile unit controller 12 controls the signal controller 24 to analyze the RF signal received from the facsimile apparatus 2.

Thereafter, the method proceeds to step 203 where the mobile unit controller 12 checks whether the analyzed data corresponds to the print request key data for the set contents of the mobile unit 1. If the analyzed data corresponds to the print request key data, the mobile unit controller 12 proceeds the method to step 204 and, if not, the mobile unit controller 12 proceeds the method to step 206 and ends the program according to the present invention. At step 204, the mobile unit controller 12 reads the data corresponding to the set contents from the memory 16. The method then proceeds to step 205 when the mobile unit controller 12 transmits the read data to the facsimile apparatus 2 via the RF transmitter 18, and the method proceeds to step 206 for mobile unit 1 to end. Then, the method also proceeds to step 106 where the CPU 50 receives the data corresponding to the set contents of the mobile unit 1 via the RF receiver 36. The method then proceeds to step 107 where the CPU 50 enables the printer 56 to print the set contents on the recording paper. After the set contents arc printed, the method then proceeds to step 108 to end.

As described above, at the request for printing the set contents of the mobile unit 1, the facsimile apparatus 2 selects a corresponding one of the mobile units 1 and requests the selected mobile unit 1 to transmit the set contents data. Then, the mobile unit 1 reads the set contents data stored in the memory 16 and transmits the read set contents data to the facsimile apparatus 2. The facsimile apparatus 2 receives the set contents data transmitted from the mobile unit 1 and prints it on the recording paper, so that the user may confirm the set contents of the mobile unit 1.

Figures 4A, 4B:
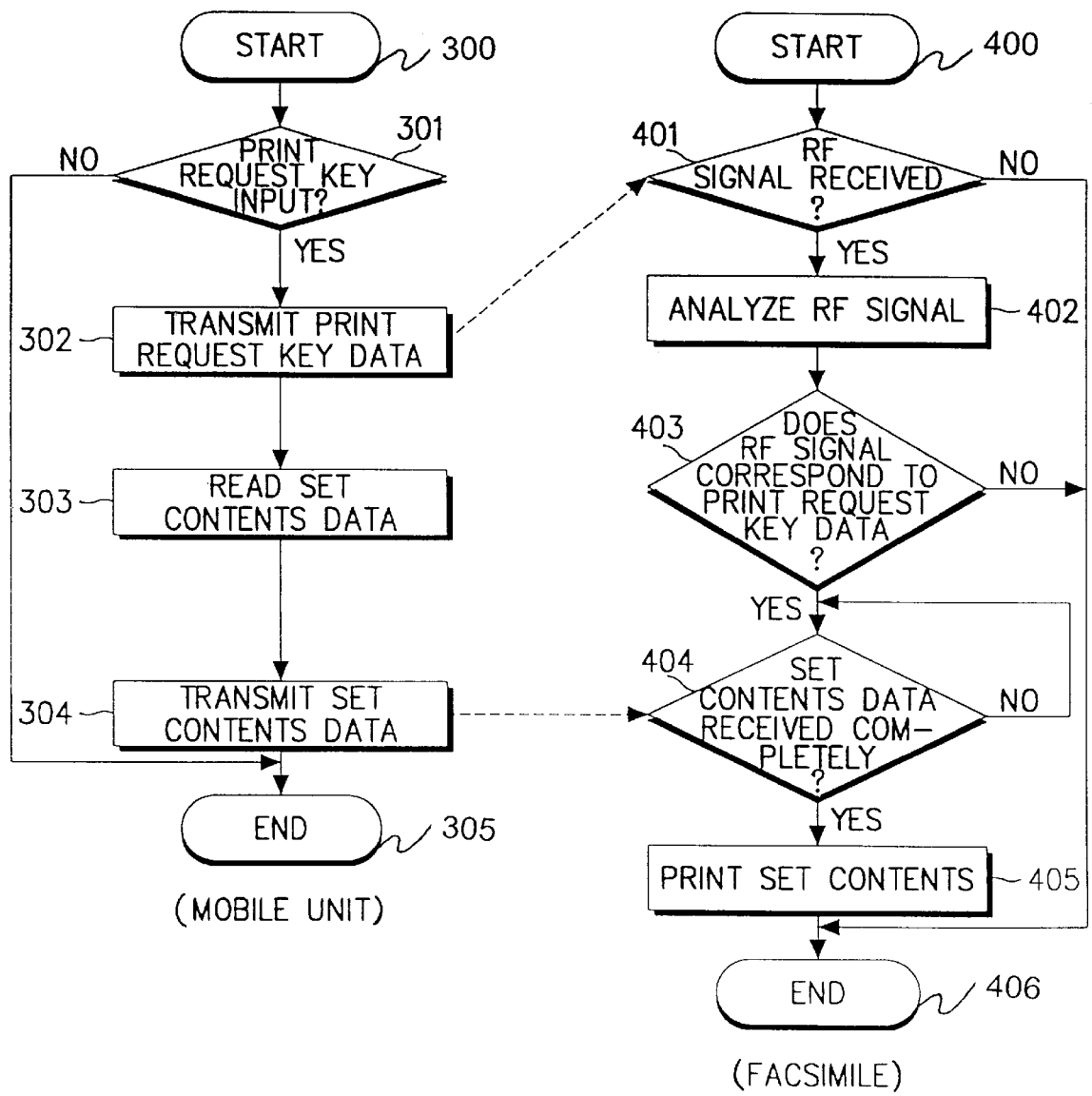
FIGS. 4A and 4B are flow charts for printing the set contents of the mobile unit in response to a print request from the mobile unit according to an embodiment of the present invention.

FIGS. 4A and 4B illustrate flow charts for printing the set contents of the mobile unit 1 in response to a print request from the mobile unit 1 according to an embodiment of the present invention. With reference to FIGS. 4A and 4B, the mobile unit 1 reads and transmits the data corresponding to the set contents stored in the memory 16 to the facsimile apparatus 2, at the request of the user. Then, upon receiving the data for the set contents, the facsimile apparatus 2 prints the set contents on the recording paper using the printer 56. Further, the facsimile apparatus 2 communicates with the mobile unit 1 through the radio channel therebetween.

Referring to FIGS. 4A and 4B, steps 301–304 of FIG. 4A show a control flow of the mobile unit 1 and steps 401–405 of FIG. 4B show a control flow of the facsimile apparatus 2. The method starts at step 300 and proceeds to step 301 where the mobile unit controller 12 checks whether the user of the mobile unit 1 has depressed the print request key 10A of the keypad 10 to generate print request key data. If the print request key 10A for the set contents is depressed, the mobile unit controller 12 proceeds the method to step 302, and, if not, the mobile unit controller 12 proceeds the method to step 305 and ends the program according to the invention and remains in the stand-by state. At step 302, the mobile unit controller 12 transmits the print request key data for the set contents to the facsimile apparatus 2 via the RF transmitter 18; and the mobile unit controller 12 then proceeds the method to step 303 and reads the set contents data stored in the memory 16. Thereafter, the method proceeds to step 304 where the mobile unit controller 12 transmits the set contents data read from the memory 16 to the facsimile apparatus 2 via the radio channel.

In the meantime, as to the facsimile apparatus 2, the method starts at step 400 and proceeds to step 401 where the CPU 50 of the facsimile apparatus 2 checks whether the RF receiver 36 has received the RF signal corresponding to the print request key data for the set contents. If the RF signal is received, the CPU 50 proceeds the method to step 402 and, if not, the CPU 50 proceeds the method to step 406 and ends the program according to the invention. At step 402, the CPU 50 analyzes the received RF signal, and then the CPU 50 proceeds the method to step 403 to check whether the analyzed RF signal corresponds to the print request key data. If the analyzed RF signal corresponds to the print request key data, the CPU 50 proceeds the method to step 404 and, if not, the CPU 50 proceeds the method to step 406 and ends the program. At step 404, the CPU 50 checks whether the RF receiver 36 has completely received the set contents data transmitted from the mobile unit 1. If the set contents data has been received completely, the CPU 50 proceeds the method to step 405 and, if not, the CPU 50 waits and the method remains at step 404 until the set contents data is received completely. At step 405, the CPU 50 causes the printer 56 to print the received set contents on the recording paper. After the set contents have been printed, the method proceeds to step 406 to end. In this manner, a user of the mobile unit 1 and a user of the facsimile apparatus 2 can confirm the set contents of the mobile units 1, by seeing the set contents printed on the recording paper.

As described above, the facsimile apparatus 2 according to the present invention prints the set contents of the mobile units 1 on the recording paper at the request of the user, so that the user may readily confirm the set contents.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for candying out the present invention, but that the present invention includes all embodiments falling within the scope of the appended claims.

What is claimed is:

1. A method for printing set contents of a mobile unit of a facsimile apparatus, comprising the steps of:

generating a print request for the set contents of a selected mobile unit from a plurality of mobile units;

selecting and dialing by the facsimile apparatus an extension number for the selected mobile unit for which the set contents are requested by the print request;

requesting by the facsimile apparatus for the selected mobile unit to transmit set contents data corresponding to the set contents of the selected mobile unit;

reading by the selected mobile unit the set contents data stored in a memory of the selected mobile unit in response to the requesting step;

wirelessly transmitting by the selected mobile unit to the facsimile apparatus the set contents data read by the selected mobile unit;

wirelessly receiving by the facsimile apparatus the set contents data wirelessly transmitted from the selected mobile unit; and printing the set contents corresponding to the set contents data from the selected mobile unit on a recording paper.

2. The method as claimed in claim 1, further comprised of generating the print request comprises depressing a print request key of the facsimile apparatus.

3. The method as claimed in claim 1, further comprised of generating the print request comprises depressing a print request key of the selected mobile unit.

4. A method for printing set contents of a mobile unit of a facsimile apparatus, the facsimile apparatus having a plurality of mobile units, comprising the steps of:

generating a print request for the set contents of a selected mobile unit from the plurality of mobile units;

selecting and dialing by the facsimile apparatus an extension number for the selected mobile unit for which the set contents are requested by the print request;

requesting by the facsimile apparatus for the selected mobile unit to transmit set contents data corresponding to the set contents of the selected mobile unit;

reading by the selected mobile unit the set contents data stored in a memory of the selected mobile unit in response to the requesting step;

transmitting from the selected mobile unit to the facsimile apparatus the set contents data read from the memory of the selected mobile unit;

receiving by the facsimile apparatus the set contents data corresponding to the set contents of the selected mobile unit; and printing the set contents of the selected mobile unit on a recording paper.

5. A method for printing set contents of a mobile unit in a facsimile apparatus having the mobile unit, comprising the steps of:

causing generation of a print request for the set contents of a selected mobile unit from a plurality of mobile units;

causing the facsimile apparatus to select and dial an extension number for the selected mobile unit for which the set contents are requested by the print request;

causing the facsimile apparatus to request the selected mobile unit to transmit set contents data corresponding to the set contents of the selected mobile unit;

causing the mobile unit to read the set contents data corresponding to the set contents of the selected mobile unit stored in a memory of the selected mobile unit in response to the print request for the set contents and to wirelessly transmit the set contents data read from the memory of the selected mobile unit to the facsimile apparatus; and causing the facsimile apparatus to wirelessly receive the set contents data wirelessly transmitted by the selected mobile unit and to print the set contents corresponding to the set contents data from the selected mobile unit on a recording paper.

6. The method as claimed in claim 5, further comprised of the print request being made by depressing a print request key of the facsimile apparatus.

7. The method as claimed in claim 5, further comprised of the print request being made by depressing a print request key of the selected mobile unit.

8. A method for printing set contents of a mobile unit in a facsimile apparatus having a plurality of mobile units, comprising the steps of:

causing generation of a print request for the set contents of a selected mobile unit from the plurality of mobile units;

causing the facsimile apparatus to select and dial an extension number for the selected mobile unit from the plurality of mobile units for which the set contents are to be printed, in response to the print request;

causing the facsimile apparatus to request the selected mobile unit to transmit set contents data corresponding to the set contents of the selected mobile unit;

causing the selected mobile unit to read the set contents data stored in a memory of the selected mobile unit in response to the print request and to wirelessly transmit the set contents data read from the memory of the selected mobile unit to the facsimile apparatus; and causing the facsimile apparatus to wirelessly receive the set contents data wirelessly transmitted by the selected mobile unit corresponding to the set contents of the selected mobile unit.

9. An apparatus for printing set contents of a mobile unit of a facsimile apparatus, comprising:

means for generating a print request for the set contents of a selected mobile unit from a plurality of mobile units;

means for selecting and dialing by the facsimile apparatus an extension number for the selected mobile unit for which the set contents are requested by the print request;

means for requesting by the facsimile apparatus for the selected mobile unit to transmit set contents data corresponding to the set contents of the selected mobile unit;

means for reading by the selected mobile unit the set contents data stored in a memory of the selected mobile unit;

means for wirelessly transmitting by the selected mobile unit to the facsimile apparatus the set contents data read from the memory of the selected mobile unit;

means for wirelessly receiving by the facsimile apparatus the set contents data wirelessly transmitted by the selected mobile unit corresponding to the set contents of the selected mobile unit; and means for printing the set contents of the selected mobile unit on a recording paper.

10. The apparatus as claimed in claim 9, further comprised of the means for generating the print request comprises a print request key of the facsimile apparatus.

11. The apparatus as claimed in claim 9, further comprised of the means for generating the print request comprises a print request key of the selected mobile unit.

* * * * *